United States Patent [19]

Shimada et al.

[11] Patent Number: 5,408,592
[45] Date of Patent: Apr. 18, 1995

[54] PRINTER HAVING A DATA OUTPUT TIME CONTROLLER

[75] Inventors: Yasuo Shimada; Toshiki Harukawa; Masatoshi Kokubo, all of Nagoya, Japan

[73] Assignee: Brother Kogyo Kabushiki Kaisha, Nagoya, Japan

[21] Appl. No.: 832,044

[22] Filed: Feb. 6, 1992

[30] Foreign Application Priority Data

Mar. 20, 1991 [JP] Japan .................................. 3-057049

[51] Int. Cl.$^6$ .............................................. G06F 15/00
[52] U.S. Cl. ....................................... 395/111; 395/112
[58] Field of Search ............... 395/109, 101, 111, 115, 395/112; 358/447, 451, 474, 434, 443; 271/264; 346/154, 134

[56] References Cited

U.S. PATENT DOCUMENTS 4,741,635  5/1988  Shibata et al. .
4,847,641  7/1989  Tung .
5,025,325  6/1991  Hudson ............................... 358/447
5,040,022  8/1991  Kinoshita et al. .
5,167,014  11/1992  Shimomura .......................... 395/111

FOREIGN PATENT DOCUMENTS 0385421   9/1990  European Pat. Off. ............ 395/109
2-112966  4/1990  Japan .
2-172766  7/1990  Japan .
2185608   7/1987  United Kingdom .
2202662A  9/1988  United Kingdom .

OTHER PUBLICATIONS

"Patent Abstracts of Japan", vol. 14, No. 551, p. 1139; Dec. 1990 & Jp 2-235135A; Sep. 89.

*Primary Examiner*—Arthur G. Evans
*Attorney, Agent, or Firm*—Oliff & Berridge

[57] ABSTRACT

A printer, where an image can be printed on a desired position of a printing paper both when image data is processed and when the image data is not processed, counterbalances the time delay caused by data processing by advancing the timing in which a controller outputs the image data. When the print operation is requested, the controller judges whether the data processing is set ON or OFF if the data processing circuit is connected. When the data processing is set ON, offsets of left and right or up and down are changed in order to quicken the output timing of the image data. The above timing is changed based on the time for which the data corresponds to the data of (M−1)/2 bits, and (N−1)/2 rows of a table are output by the controller.

6 Claims, 5 Drawing Sheets

FIG. 3B

| ITEM | INSTRUCTIONS |
|---|---|
| 300 | OUTPUT FEED REQUESTING SIGNAL |
| 310 | START PAPER FEEDING |
| 320 | FEED STARTING SIGNAL RETURNED |
| 330 | HIGH RESOLUTION PRINT REQUESTED? |
| 340 | CALCULATE ADDRESS CORRESPONDING TO INITIAL VALUE BUFFER |
| 350 | STORE CALCULATED ADDRESS IN ADDRESS BUFFER |
| 360 | READ IMAGE DATA FROM ADDRESS STORED IN ADDRESS BUFFER |
| 370 | OUTPUT IMAGE DATA TO ENGINE UNIT |
| 380 | EXECUTE PRINTING AT ENGINE UNIT |
| 390 | CALCULATE ADDRESS CORRESPONDING TO VALUE OF OFFSET BUFFER |
| 400 | STORE CALCULATED ADDRESS IN ADDRESS BUFFER |
| 410 | READ IMAGE DATA FROM ADDRESS STORED IN ADDRESS BUFFER |
| 420 | PROCESS IMAGE DATA |
| 430 | OUTPUT PROCESSED IMAGE DATA |

PRINTER HAVING A DATA OUTPUT TIME CONTROLLER

BACKGROUND OF THE INVENTION

1. Field of the Invention

The present invention relates to a printer for processing print data output from a controller and, more particularly, to a printer for processing print data output from a controller and then inputting the processed data to an engine unit.

2. Description of Related Art

A conventional printer comprises a data processing circuit between a controller which outputs print data and an engine unit where the print operation is executed based on the output print data. The technique concerning the conventional printer is disclosed, for example, in Japanese Laid-Open Patent Publication No. 2-172766 and U.S. Pat. No. 4,847,641 (Japanese Laid-Open Patent Publication No. 2-112966). As the above-mentioned data processing circuit, a circuit has been proposed for inputting the print data output from the controller to the engine unit after being processed, for example, after having the resolution of the data improved.

A printing operation is executed as follows in such a conventional printer. First, the controller instructs an engine unit to feed a printing paper. The engine unit receives the instruction and starts to feed the printing paper. The engine unit returns a feed starting signal of the printing paper to the controller. The controller, upon receipt of the start signal, outputs the print data at the appropriate time when a predetermined amount of the printing paper is sent, i.e., for example, at the time that the printing paper is sent off only for the blank to be provided on the top of the sheet. The output print data is processed as high resolution print data with respect to other print data which exist around it, when the output print data passes through the data processing circuit. The processed print data which has passed through the data processing circuit input to the engine unit. The engine unit then prints a predetermined image according to the input print data.

According to the above-mentioned conventional printer, for example, when the engine unit has a print ability of high resolution of 600 dpi (dots per inch), even if the data output from the controller corresponds only to 300 dpi, the substantial print image of 600 dpi which makes the best use of the efficiency of the engine unit can be obtained by processing the print data to 600 dpi resolution by the data processing circuit.

However, in the above-mentioned conventional printers, the print data output from the controller may pass the data processing circuit so that the data is input to the engine unit later than the predetermined timing. As a result, a problem results in that the position of the image printed on the printing paper shifts from a predetermined position. For instance, an image 19 which should be printed on the center of a printing paper 17 was printed as an image P moved to the lower right as shown in FIG. 4(C) with the two-dash chain line because of the delay of the input of the print data.

SUMMARY OF THE INVENTION

An object of the present invention is to provide a printer which can solve the above-mentioned problem and can print an image on a desired position of a printing paper.

In order to attain the above object, a printer according to this invention includes a controller for outputting print data, a data processing unit for processing the print data, and an engine unit for executing a print operation based on the processed print data. The engine unit receives an instruction from the controller and starts to feed the printing paper, and, simultaneously, the controller receives a feed starting signal of the printing paper from the engine unit and outputs print data with a predetermined timing. An image based on the processed print data is then printed on the desired position of the printing paper decided by the above timing. An output advancing means is provided, the output advancing means advancing the time when the controller outputs the printing data by considering the time of delay caused by which an input of the printing data to the engine unit is delayed by the data processing in the data processing unit.

In the printer thus constructed, the engine unit receives the instruction from the controller and starts to feed the printing paper, and, simultaneously, the controller receives the feed starting signal of the printing paper from the engine unit and outputs the print data with the predetermined timing. At this time, means for advancing data output timing advances the timing for which the controller outputs the print data, to account for the time of delay caused by which an input of the print data to the engine unit is delayed by the data processing in the data processing means. Therefore, the above-mentioned time of delay is counterbalanced by advancing the above-mentioned timing. As a result, the image based on the processed print data is printed on the desired position of the printing paper decided by predetermined timing.

According to the printer of the present invention as mentioned above, the image based on the processed print data can be printed on the desired position of the printing paper, because the time of delay caused by the data processing is counterbalanced by advancing the timing for which the controller outputs the print data.

BRIEF DESCRIPTION OF THE DRAWINGS

A preferred embodiment of the present invention will be described in detail with reference to the following figures wherein:

FIG. 3a and 3b are flowcharts showing a print processing routine to be executed in the controller and an engine unit.

DETAILED DESCRIPTION OF THE PREFERRED EMBODIMENT

Hereafter, the preferred embodiments of the present invention will be described hereunder with reference to the accompanying drawings.

Figure 1:
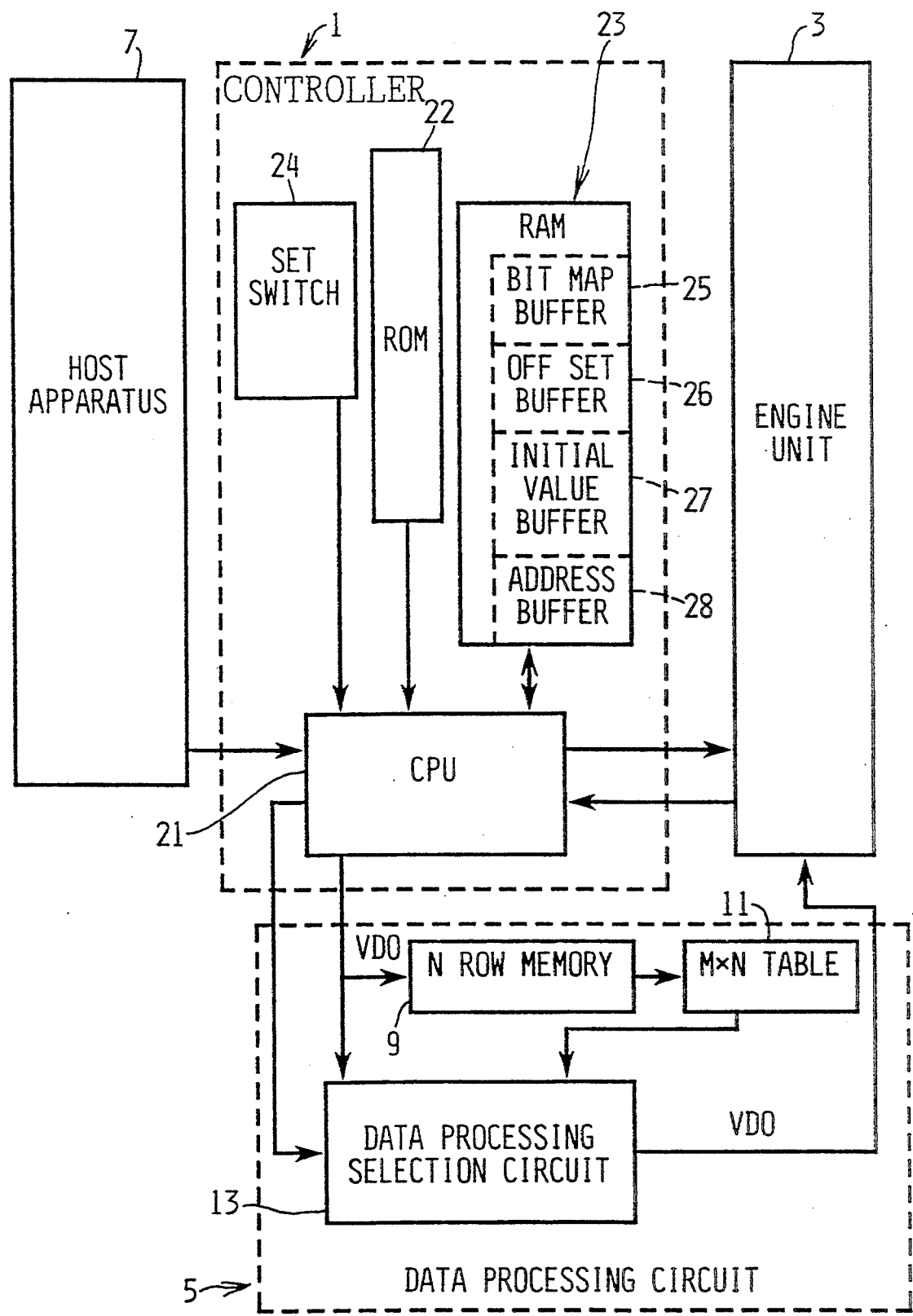
FIG. 1 is a block diagram showing a main structure of the printer which embodies the present invention.

A printer of this embodiment is a laser printer having a controller 1, an engine unit 3, and a data processing circuit 5 as shown in FIG. 1. The controller 1 is an arithmetic logic operation circuit which has a CPU 21, a ROM 22 and a RAM 23. A host apparatus 7 for inputting data to be printed to the printer, the engine unit 3, and the data processing circuit 5 are connected to the CPU 21.

Figure 2:
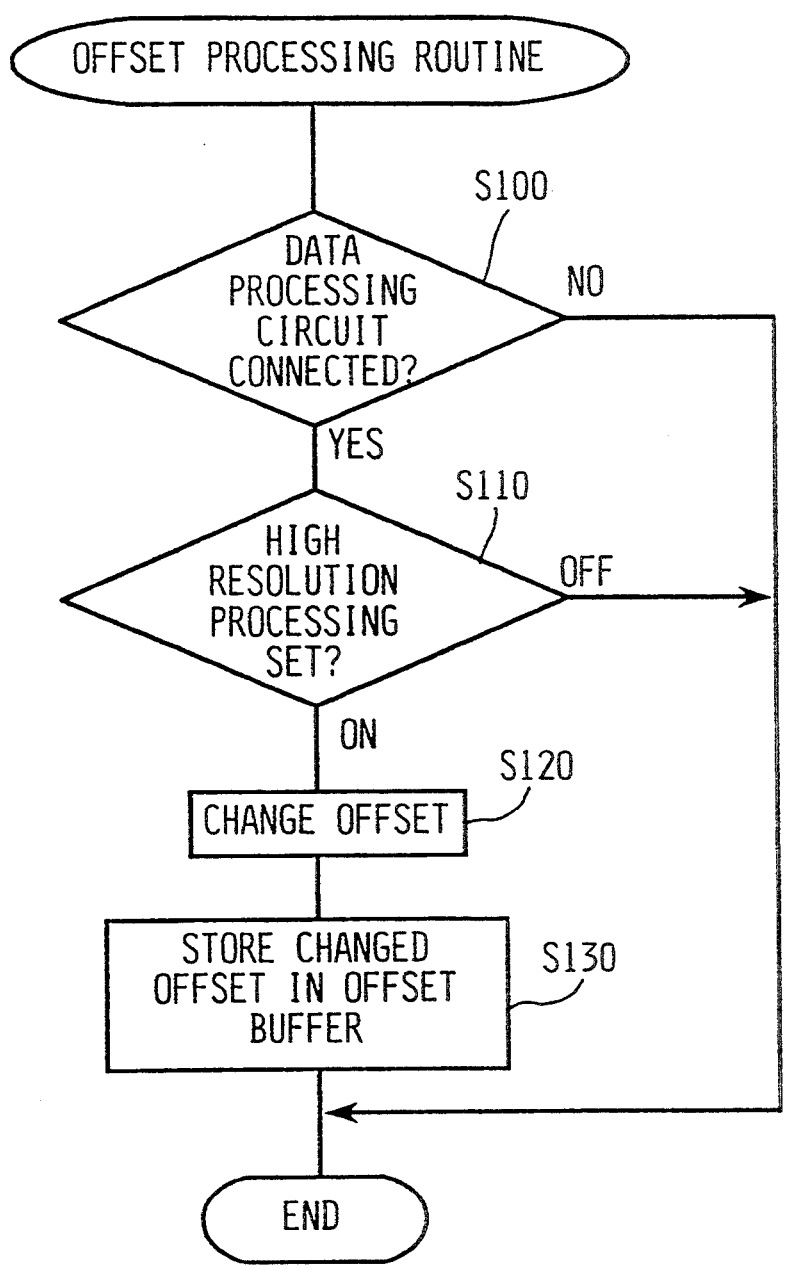
FIG. 2 is a flowchart showing an offset processing routine to be executed in a controller.
Figure 3A:
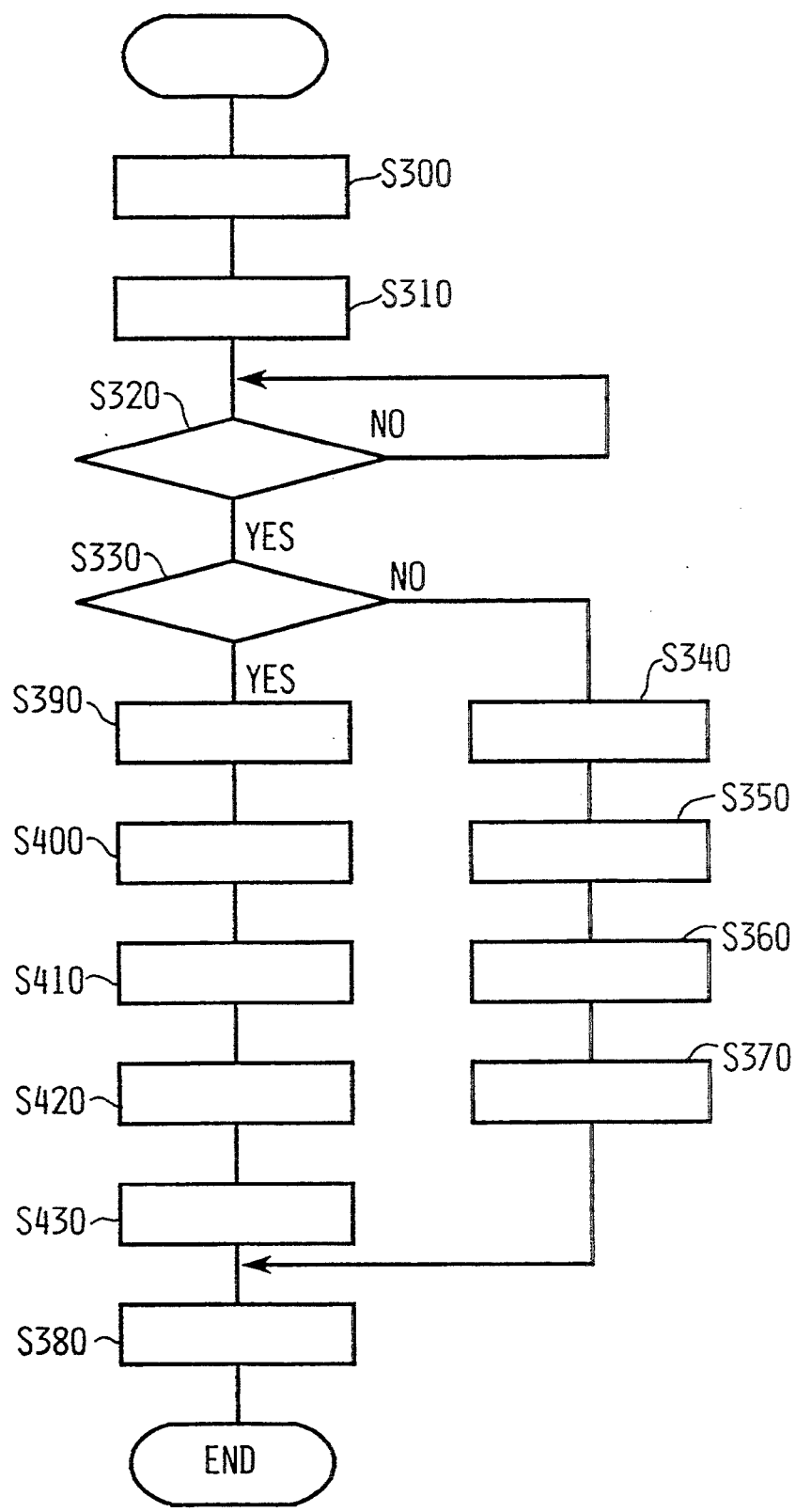

The controller 1 makes image data VDO (which corresponds to the print data) developed as a bit map based on a character code input from the host apparatus 7 by executing predetermined processing, and stores the image data VDO in a bit map buffer 25 in the RAM 23. The image data VDO for one page is stored in the bit map buffer 25 by being renewed sequentially. In addition, the RAM 23 has an offset buffer 26 where the offset changed in an offset processing routine (as shown in FIG. 2) is stored, an initial value buffer 27 where the offset of an initial value is stored, and an address buffer 28 where the reading address on printing in the bit map buffer 25 is stored. Other than the program for the processing routine which makes the above-mentioned image data VDO beforehand, a program for the offset processing routine (as shown in FIG. 2) which advances the output timing of the image data VDO and adjusts the print position, and the program for a print processing routine (as shown in FIG. 3) to execute the print operation in the engine unit 3 are stored in the ROM.

The engine unit 3 has a well-known construction for printing an image on a print paper based on the input image data. This construction is similar to that of the laser printer disclosed, for example, in U.S. Pat. No. 5,040,022. The printing paper feeding executed by the engine unit 3 is started by a request from the controller 1. However, the engine unit 3 does not synchronize with the controller 1. After starting the paper feeding, the engine unit 3 prints the image on printing paper 17 simultaneously with the feeding of paper based on the image data input from the controller 1 without synchronization with the controller 1. In the engine unit 3, the image is formed toward the row direction which is a main scanning direction. When the image formation is completed at an end of one row, the image formation is started again from the head of the next row which is shifted in the paper feeding direction, namely a sub scanning direction intersecting the main scanning direction.

The data processing circuit 5 has a N row memory 9 for memorizing all dots in N row, a M×N table 11, and a data processing selection circuit 13. The N row memory 9 is a static RAM and stores the image data VDO for N row, renewing the contents of the memory sequentially whenever the image data VDO is input from the controller 1. The M×N table 11 is a logic circuit which contains a comparator and converts the image data VDO stored in the N row memory 9 into the data of high resolution in an appropriate pattern by a well-known technique. In this case, the image data VDO for M dots which are adjacent in each row among all image data VDO stored in the N row memory 9 is stored in the M×N table 11. And, the image data VDO of the M×N table 11 is renewed by one dot in every N row, synchronized with the renewal of the image data VDO of the N row memory 9.

Figure 4A:
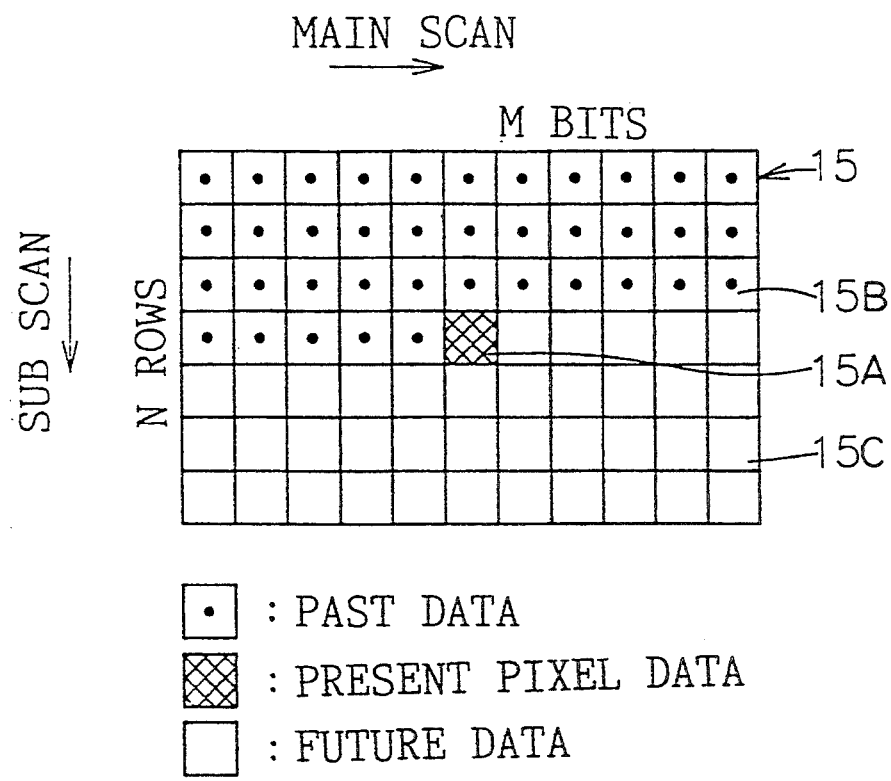
FIGS. 4(A) through 4(C) are explanatory views showing the operation of the printer of the present embodiment.

The data processing operation by the well-known method will be briefly explained. When the data is processed, a table 15 shown in FIG. 4(A) is made in the data processing circuit 5. A present pixel data 15A which is going to be presently transferred to the engine unit 3, the past data 15B which was input in the past and the future data 15C which will be input in the future are stored in the table 15. The high resolution data is prepared by comparing the present pixel data 15A with peripheral pixels by referring to the data which is around the present pixel data 15A in this table 15. The input to the engine unit 3 of image data VDO is delayed for the time period from which the present pixel data 15A is input to the data processing circuit 5 until the table 15 is filled up with the future data 15C, if the data processing is executed by such a method. Such a method is similar to the method disclosed in U.S. Pat. No. 4,847,641.

The setting of whether the data should be processed by the data processing circuit 5 is executed by a set switch 24 of the controller 1 or by a command from the host apparatus 7.

The printer thus constructed will be operated as follows. When the print execution instruction is input to the controller 1, the CPU 21 of the controller 1 starts the offset processing routine as shown in FIG. 2. When the routine is started, the CPU 21 judges whether the data processing circuit 5 is connected between the controller 1 and the engine unit 3 (S100). When it is judged to be connected (S100:YES), the CPU 21 then judges whether the processing of the high resolution data is set ON or OFF based upon the condition of set switch 24 (S110). When it is judged to be ON (S110:ON), a processing for changing the offset of left and right or up and down as explained below in order to advance the output timing of the image data is executed (S120). The changed offset is stored in an offset buffer (S130). On the other hand, when it is judged that the data processing circuit 5 is not connected (S100:NO), or when the setting of the high resolution data processing is judged to be OFF (S110:OFF), the CPU 21 does not execute the offset change processing (S120), and ends this routine. The offset is changed as follows in the processing of the above-mentioned step S120. As explained with reference to FIG. 4(A), the time delay on inputting the image data VDO to the engine unit 3 caused by the data processing in the data processing circuit 5 is almost equal to the time from which the present pixel data 15A is input to the data processing circuit 5 until the table 15 is filled up with the future data 15C. The image P is slid and printed in the scanning direction, that is, in the lower right direction on the printing paper 17 by only the distance which corresponds to the data of (M−1)/2 bits and (N−1)/2 rows of the table 15 by the delay of this input. Therefore, the time when the table 15 is filled up with the future data 15C is almost equal to the time in which the timing that the controller 1 outputs the image data VDO should be advanced. The offset is changed based on this time in the printer as embodied by the present invention. In addition, an initial value of the offset is decided by the input data from the host apparatus 7, for example, the input data which shows the top or left margin, and is stored in an initial value buffer 27.

The print processing shown in the flowchart of FIG. 3 is started after the offset is set by executing the above-mentioned routine.

Figure 4B:
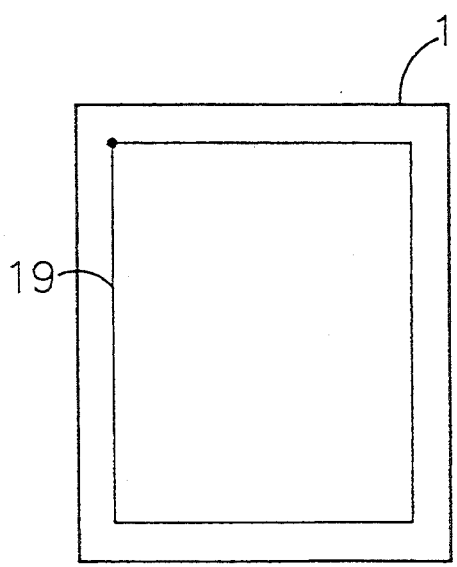

When the print routine is started, the controller 1 first requests the engine unit 3 to feed the printing paper 17 in accordance with an output feed requesting signal (S300). The engine unit 3 receives this request and starts to feed the printing paper 17 (S310). The controller 1 determines whether the engine unit 3 returns the feed starting signal of the printing paper 17 to the controller 1 (S320). The controller 1 waits for the feed starting signal if the feed starting signal has not yet arrived (S320:N0). When the controller 1 receives the feed starting signal (S320:YES), the controller 1 judges whether the printing data is requested to be printed at high resolution (S330). If the high resolution is not requested (S330:N0), the controller outputs the image data by the timing decided by the input data from the host apparatus 7, that is, by the timing based on the initial value of the offset. In other words, the address which corresponds to the value of the initial value buffer 27 is calculated (S340), and the calculated address is stored in the address buffer 28 (S350). The image data VDO of the bit map buffer 25 is read sequentially from the address stored in the address buffer 28 (S360) and is output to the engine unit 3 (S370). Therefore, the engine unit 3 starts to receive the image data VDO output by the controller 1 and executes the printing at engine unit 3 based on the input image data VDO, when the engine unit 3 feeds the printing paper 17 for only the amount based on the initial value of the offset (S380). As a result, the image 19 is printed at the desired position of the printing paper 17 as shown in FIG. 4(B).

Figure 4C:
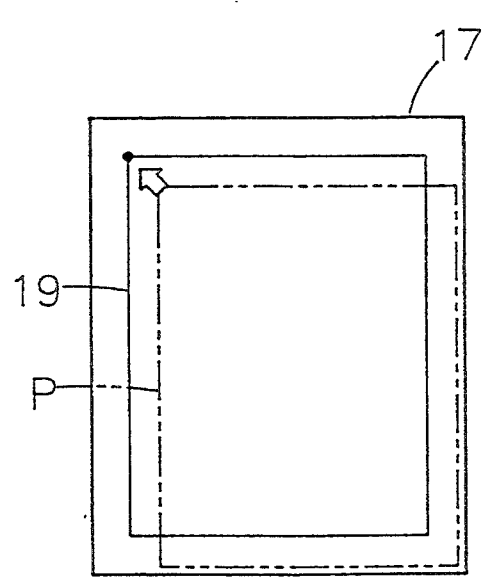

On the other hand, if the high resolution is requested (S330:YES), the controller 1 which receives the feed starting signal of the printing paper starts to output the image data VDO with quick timing based on the offset changed by executing the above-mentioned routine. In other words, the above operation is realized by advancing the read address in the bit map buffer 25 for the value of the calculated address which corresponds to the value stored in the offset buffer 26 (S390). The calculated address is stored in the address buffer 28 (S400), and the image data VDO of the bit map buffer 25 is read sequentially from the address stored in the address buffer 28 (S410). The output image data is processed to the image data VDO of high resolution when it passes through the data processing circuit 5 (S420), and the processed image data is output to the engine unit 3 being delayed in only the time used for processing (S430). Therefore, the time that the controller 1 advances the output timing of image data VDO is spent in the data processing circuit 5, and the delay caused by the data processing circuit 5 are counterbalanced. The image data VDO of high resolution is input to the engine unit 3 by timing as if there were no data processing circuit 5. As a result, when the engine unit 3 starts to print based on the image data VDO of high resolution (S380), the image 19 is printed at the desired position of the printing paper 17 as shown in FIG. 4(C) as in the above mentioned case where the data is not processed as shown in FIG. 4(B).

As explained above, according to the printer which embodies the present invention, the image can be printed at the desired position of the printing paper even when the data is processed in addition to when the data is not processed, because the time delay by the data processing is counterbalanced by advancing the timing by which the controller 1 outputs the image data VDO.

Moreover, there is an advantage that it is possible to get the above-mentioned effect only by an easy construction wherein timing which the controller 1 outputs the image data VDO is advanced. As the other construction which counterbalances the delay by the data processing, for instance, it is possible to construct the device to move the image data which has the image in the reverse direction as the direction where the print is shifted by the time delay and to print based on such image data. However, this construction has a disadvantage wherein it takes additional time to perform the image processing and leads to the enlargement of the device. The construction of the present invention which advances the above-mentioned output timing has no such disadvantage.

It is to be understood that the present invention is not restricted to the particular forms shown in the foregoing embodiment, and various modifications and alterations can be added thereto without departing from the scope of the invention encompassed by the appended claims. For example, it is possible to embody the present invention in a printer in which a data processing circuit processes data into a low resolution.

What is claimed is:

1. A printer for printing an image based on printing data input from a host apparatus, comprising:
    a controller for controlling print execution to output printing data at a predetermined timing based on input printing data,
    data processing means for processing the input printing data,
    engine means for printing an image on a printing medium based on a one of the processed printing data processed by said data processing means and the input printing data, and
    output advancing means for advancing the time, from the predetermined timing, when the controller outputs the printing data by determining a time period of delay by which said data processing means delays an input of the printing data to the engine means,
    wherein said engine means includes feed means for feeding the printing medium and signal means for sending a feed starting signal to said controller, and said controller includes a first instruction means for instructing said engine means to feed the printing medium, output means for outputting the printing data when a predetermined time, which constitutes the predetermined timing, has passed after receiving the feed starting signal from said signal means, a data memory for storing the printing data, and reading means for reading the printing data from said data memory.

2. The printer according to claim 1, wherein said controller further comprises a bypass means for bypassing the data processing by said data processing means.

3. The printer according to claim 1, wherein said output means outputs the printing data at the predetermined timing when said controller receives the feed starting signal from said signal means when said bypass means bypasses the data processing.

4. The printer according to claim 2, wherein said controller further comprises a switch for instructing said bypass means to bypass the data processing.

5. The printer according to claim 2, wherein said controller further comprises second instruction means for instructing said bypass means to bypass the data processing based on a command input from the host apparatus.

6. The printer according to claim 1, said output advancing means includes an address indicating means for indicating a latter address as a start address for reading the printing data from said data memory.

* * * * *

UNITED STATES PATENT AND TRADEMARK OFFICE
CERTIFICATE OF CORRECTION

PATENT NO. : 5,408,592
DATED : April 18, 1995
INVENTOR(S) : Yasuo Shimada; Toshiki Narukawa; and Masatoshi Kokubo It is certified that error appears in the above-indentified patent and that said Letters Patent is hereby corrected as shown below:

On the Title Page:
1, line [75], please change "Harukawa" to --Narukawa--.

Signed and Sealed this

Thirteenth Day of June, 1995

*Attest:*

BRUCE LEHMAN

*Attesting Officer*     *Commissioner of Patents and Trademarks*